US012207196B2

(12) United States Patent
Liu et al.

(10) Patent No.: US 12,207,196 B2
(45) Date of Patent: Jan. 21, 2025

(54) EFFICIENT PREAMBLE DESIGN AND MODULATION SCHEMES FOR WAKE-UP PACKETS IN WLAN WITH WAKE-UP RADIO RECEIVERS (71) Applicant: MEDIATEK INC., Hsin-Chu (TW)

(72) Inventors: Jianhan Liu, San Jose, CA (US); Po-Yuen Cheng, San Jose, CA (US); Thomas Edward Pare, Jr., Mountain View, CA (US)

(73) Assignee: MEDIATEK INC. (TW)

( * ) Notice: Subject to any disclaimer, the term of this patent is extended or adjusted under 35 U.S.C. 154(b) by 0 days.

(21) Appl. No.: 18/220,126

(22) Filed: Jul. 10, 2023

(65) Prior Publication Data

US 2023/0354195 A1 Nov. 2, 2023

Related U.S. Application Data (63) Continuation of application No. 15/928,514, filed on Mar. 22, 2018, now Pat. No. 11,729,716.

(60) Provisional application No. 62/483,969, filed on Apr. 11, 2017.

(51) Int. Cl.
*H04W 52/02* (2009.01)
*H04L 27/04* (2006.01)
*H04W 84/12* (2009.01)

(52) U.S. Cl.
CPC ......... *H04W 52/0229* (2013.01); *H04L 27/04* (2013.01); *H04W 52/0235* (2013.01); *H04W 84/12* (2013.01); *Y02D 30/70* (2020.08)

(58) Field of Classification Search
CPC .... H04W 52/0229; H04W 84/12; H04L 27/04
See application file for complete search history.

(56) References Cited

U.S. PATENT DOCUMENTS

| | | |
|---|---|---|
| 5,305,347 A | 4/1994 | Roschmann et al. |
| 2011/0243267 A1 | 10/2011 | Won et al. |
| 2012/0163480 A1 | 6/2012 | Nemeth et al. |
| 2014/0050133 A1 | 2/2014 | Jafarian et al. |
| 2014/0112225 A1 | 4/2014 | Jafarian et al. |
| 2014/0204822 A1 | 7/2014 | Park et al. |

(Continued)

FOREIGN PATENT DOCUMENTS

| | | |
|---|---|---|
| CN | 107770848 A1 | 3/2018 |
| EP | 3528557 A1 | 8/2019 |

(Continued)

*Primary Examiner* — Derrick V Rose (57) ABSTRACT

Systems and methods of transmitting and receiving a Wake-Up Radio (WUR) packet by using a simplified preamble structure that contains no training field. The preamble carries a signature sequence selected from a set of predefined sequences, each corresponding to a different data transmission rate. The preamble and the control information of the WUR packet are transmitted in the same rate as indicated by the selected sequence. Hence, a receiving WUR can determine the data transmission rate and locate the associated control information directly if a sequence that matches a predefined signature sequence is detected. The same sequence or in combination with an additional sequence in the preamble may also be used to indicate automatic gain control synchronization, packet type and other related information.

20 Claims, 7 Drawing Sheets (56) References Cited

U.S. PATENT DOCUMENTS

| | | |
|---|---|---|
| 2014/0269666 A1 | 9/2014 | Marsh et al. |
| 2015/0229507 A1 | 8/2015 | Kim et al. |
| 2016/0337973 A1 | 11/2016 | Park et al. |
| 2016/0381636 A1 | 12/2016 | Park et al. |
| 2017/0094600 A1 | 3/2017 | Min et al. |
| 2018/0007629 A1* | 1/2018 | Dorrance .......... H04W 52/0229 |
| 2018/0115952 A1 | 4/2018 | Shellhammer et al. |
| 2019/0281551 A1 | 9/2019 | Kim et al. |
| 2019/0289549 A1* | 9/2019 | Lim .................. H04W 52/0219 |
| 2020/0015166 A1* | 1/2020 | Ahn .................... H04L 27/0008 |
| 2020/0100182 A1* | 3/2020 | Yun .................. H04W 52/0235 |

FOREIGN PATENT DOCUMENTS

| | | |
|---|---|---|
| WO | 2016186738 A1 | 11/2016 |
| WO | 2018131883 A1 | 7/2018 |

\* cited by examiner

EFFICIENT PREAMBLE DESIGN AND MODULATION SCHEMES FOR WAKE-UP PACKETS IN WLAN WITH WAKE-UP RADIO RECEIVERS

CROSS REFERENCE TO RELATED APPLICATION

This patent application is a continuation of and claims priority and benefit of the U.S. patent application Ser. No. 15/928,514, entitled "EFFICIENT PREAMBLE DESIGN AND MODULATION SCHEMES FOR WAKE-UP PACKETS IN WLAN WITH WAKE-UP RADIO RECEIVERS," filed Mar. 22, 2018, and claims priority and benefit of the U.S. Provisional Patent Application No. 62/483,969, entitled "EFFICIENT PREAMBLE DESIGN AND MODULATION SCHEMES FOR WAKE-UP PACKETS IN WLAN WITH WAKE-UP RADIO RECEIVERS," filed on Apr. 11, 2017, the entire content of which are herein incorporated by reference for all purposes.

TECHNICAL FIELD

Embodiments of the present disclosure relate generally to the field of network communication, and more specifically, to the field of communication protocols used in wireless communication.

BACKGROUND OF THE INVENTION

Wireless local area networks (WLANs) and mobile communication devices have become increasingly ubiquitous, such as smart phones, wearable devices, various sensors, Internet-of-Things (IoTs), etc. With their overall size constrained by portability requirements, such communication devices typically are powered by a built-in battery of limited charging capacity. Most workloads performed by a communication device can be communication-driven and therefore the internal wireless radio is a major power consumption source as it needs to remain operational to ensure prompt responses to data communication requests.

To reduce power consumption by the wireless radios, some communication devices include a low-power wake-up radio (WUR) in addition to a main radio that is used for data transmission and reception. When it is not involved in data communication tasks, the main radio can be placed into a power conservation state, e.g., a sleeping mode or even turned off. On the other hand, the low-power WUR remains active and operates to activate the main radio whenever the WUR receives a data communication request that is directed to the main radio, e.g., in a form of a wake-up signal transmitted from a WI-FI access point (AP).

Compared with a main radio with high rate data communication capabilities and complex processing functions, it is important that the WUR be a low-cost and low power consumption radio and yet is able to receive and process a wake-up signal and accordingly activate the main radio. For example, the nominal power consumption of a WUR can be 0.5~1 mW or even less.

In existent wireless communication protocols, the preamble of a packet usually has a complex structure with multiple training fields for carrying training symbols. A receiving device needs to decode these training symbols to determine the data transmission rate of the following payload and accordingly resolve and payload. To reduce errors in receiving and interpreting the training symbols, the symbols are transmitted at a low fixed rate regardless of the data rate used for transmitting the payload. However, this undesirably lowers channel usage efficiency and overall transmission efficiency.

SUMMARY OF THE INVENTION

Accordingly, systems and methods disclosed herein provide effective wake-up signal communication protocols by enclosing adequate preamble information in a simplified mechanism in Wake-Up Radio (WUR) packets, and this mechanism enables a receiving device to detect and resolve the wake-up signals in a power-efficient and time-efficient manner as well as with enhanced reliability.

Embodiments of the present disclosure use one or more particular sequences in the WUR packet preamble to indicate information which can be used for a number of operations including packet detection, data transmission rate detection, payload detection, automatic gain control (AGC) and/or frequency/timing synchronization. More specifically, the preamble of a WUR packet has a sequence field, the value of which is a signature sequence selected from a set of predefined sequences. Each predefined sequence corresponds to a different data transmission rate used for transmitting both the preamble and the payload (or "control information" herein) of a WUR packet. A WUR is capable of detecting any of the predefined sequences in its corresponding data transmission rate, for example by using a set of parallel correlators. In some embodiments, the plurality of predefined sequences include a pair of complementary sequences which can be detected using a single correlator. The preamble and the control information may be modulated in accordance with On/Off Key modulation.

Thus, at a receiving device, responsive to detection of a signature sequence from a received signal, the WUR on the device can treat the signal as a WUR packet and resolves the ensuing control information in a transmission rate corresponding to the detected sequence. As a result, the WUR can generate a wake-up indication to activate the main radio. In some embodiments, the preamble of a WUR packet is composed of one or more sequence fields and has no other fields. The boundary between the preamble and the following control information can be simply located by detecting the end of the sequence. Each of the signature sequence may additionally indicate a WUR packet type. Also, there may be a sequence field defined for containing a predefined sequence for indicating automatic gain control and synchronization settings.

According to embodiments of the present disclosure, the preamble in a WUR packet uses a predefined sequence to indicate a data transmission rate, instead of using training symbols as in the conventional approach. The preamble and the control information are transmitted in the same data transmission rate corresponding to the sequence. This advantageously eliminates the need for transmitting training symbols in a lower data rate than the payload, and eliminates the need for decoding the training symbols at a WUR. As a result, the WUR packet transmission efficiency and WUR power efficiency can be significantly improved. The related circuitry design of a transmitter and the WUR can be advantageously simplified. Further, as each of the predefined sequence can be relatively long, e.g., 32 bits for example, and better transmission and reception reliability can be achieved compared with training symbols.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Efficient Preamble Design and Modulation Schemes for Wake-Up Packets in WLAN with Wake-Up Radio Receivers Embodiments of the present disclosure provide communication protocols for transmitting and receiving a Wake-Up Radio (WUR) packet by using a simplified preamble structure that contains no dedicated training field. The preamble carries a signature sequence selected from a set of pre-defined sequences, each corresponding to a different data transmission rate. The preamble and the control information of the WUR packet are transmitted in the same rate as indicated by the selected sequence. Hence, a receiving WUR can determine the data transmission rate and locate the associated control information directly if a sequence that matches a predefined signature sequence is detected. The same sequence alone, or in combination with an additional sequence in the preamble, may also be used to indicate other information such as automatic gain control synchronization, packet type and other related information.

For example, for power preservation, a main radio in a wireless communication station (STA) can be powered off or placed in a sleep state or otherwise an inactive state. In such a state, the main radio is unable to receive or transmit packets. While the main radio is in the inactive state, the WUR of the STA remains active and can receive a wake-up signal transmitted from another device, e.g., the access point (AP) STA. The WUR operates to switch the main radio back to an active state responsive to a received wake-up signal.

Figure 1:
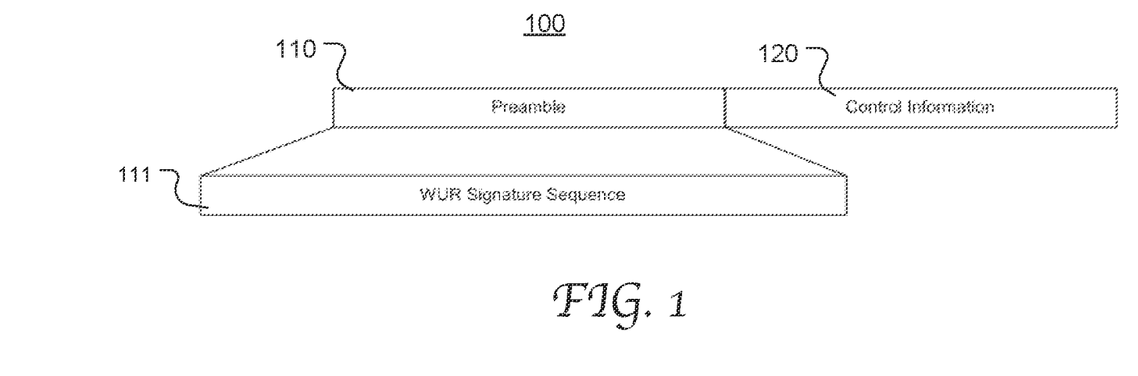
FIG. 1 illustrates the format of an exemplary WUR packet including a single signature sequence field in the preamble according to an embodiment of the present disclosure.

FIG. 1 illustrates the format of an exemplary WUR packet 100 including a single signature sequence field 111 in the preamble 110 according to an embodiment of the present disclosure. The WUR packet 100 encloses a wake-up signal in the control information 120. The wake-up signal may be a WUR beacon signal or a signal to wake up a receiving device from a sleeping mode. For example, a WUR beacon signal may be sent to the WUR periodically and provides information related to network condition, operation mode and transmission channel, and etc. In some embodiments, the WUR packet is modulated in On/Off Key (OOK) modulation and is transmitted in a narrow bandwidth (e.g., 1 MHz or 4 MHz), which can advantageously reduce power consumption and simplify the circuitry design of the WUR. Upon receiving the packet, the WUR in the receiving device can resolve the wake-up signal in the control information. If the wake-up signal is intended to wake up the main radio in the device, the WUR generates a wake-up indication and sends it to the main radio.

The signature sequence field 111 carries a signature sequence selected for the packet, e.g., a 32-bit sequence. A set of signature sequences are defined as possible values for the sequence field 111, each corresponding to a respective data transmission rate. At the transmitting device, once a rate is determined for the WUR packet, a corresponding sequence is selected and assigned to the sequence field 110. The preamble and the control information are transmitted in the same data transmission rate corresponding to the selected sequence.

In some embodiments, only three possible data rates are defined for WUR packet transmission, and correspondingly three different signature sequences, with large hamming distance, are predefined for the preamble. For instance, control information can be transmitted in a data rate selected from 125 Kbps, 250 Kbps and 500 Kbps for instances. The three signature sequences indicate the three data rates, respectively.

Besides the data transmission rate, a signature sequence may further indicate a packet type. For example, two different signature sequences are predefined, one indicative of a WUR beacon packet and the other one indicative of a WUR packet for certain target stations.

In the illustrated example, the preamble is composed of a single sequence field 111. A receiving device can locate the start of the control information based on detection of the end of the signature sequence in the signal stream. Moreover, because there is no training symbols in the preamble which requires the lowest transmission rate regardless of the transmission rate selected for the control information, it advantageously eliminates the need for changing transmission rates during transmission of the packet as well as any need for decoding training symbols at the receiving end. As a result, the WUR packet transmission efficiency and power efficiency can be significantly improved, and the pertinent circuitry design of a transmitting device and the WUR can be advantageously simplified. Further, as each of the predefined sequence can be relatively long, e.g., 32 bits for instance, better transmission and reception reliability can be achieved compared with using training symbols as in the conventional art.

It will be appreciated that a preamble according to the present disclosure may include more than one sequence field. In some embodiments, the preamble also includes a AGC/Sync sequence field used to indicate a predefined setting of automatic gain control (AGC) for a WUR to adjust the received signal strength, e.g., to reduce distortion. The AGC/Sync sequence field may further indicate a predefined frequency/timing synchronization setting for the WUR to obtain the correct start time for sampling and thereby prevent non-coherent detection error.

Figure 2:
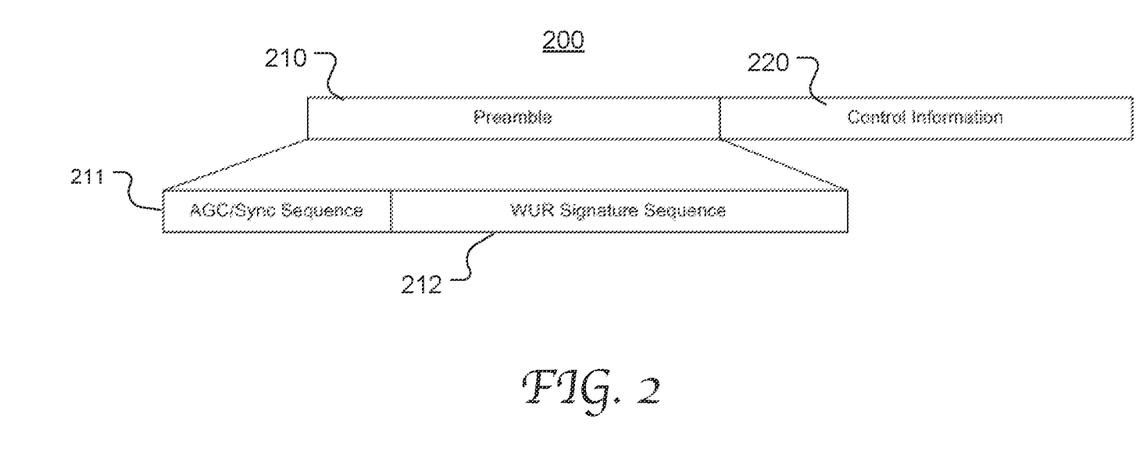
FIG. 2 illustrates the format of an exemplary WUR packet including more than one sequence fields in the preamble according to an embodiment of the present disclosure.

FIG. 2 illustrates the format of an exemplary WUR packet 200 including more than one sequence field in the preamble 210 according to an embodiment of the present disclosure. In the illustrated example, the preamble 210 has two sequence fields for indicating different information. A predefined sequence in the AGC/Sync sequence field 211 is used for indicating AGC and synchronization settings, and a predefined sequence in the signature sequence field 212 is used for indicating the data transmission rate and possibly for indicating packet type. The sequences in fields 211 and 222 and the control information 220 are transmitted in the same data rate.

Thus, by using one or more sequences, a WUR preamble can effectively provide indications for a set of information. Upon detection of the sequence(s) and without the need for decoding, a WUR can advantageously and directly ascertain reception of a WUR packet, the data transmission rate, the preamble/control information boundary, the packet type, the AGC setting and/or a synchronization setting.

The present disclosure is not limited to any specific sequence that can be used in the preamble. In some embodiments, each WUR signature sequence (e.g., in field 111 or 212) is a predefined binary sequence, which can be any sequence type, such as a Barker sequence, a pseudo-random sequence or a Golay sequence, etc. In some embodiments, the sequence can be OOK-modulated with Manchester coding which can provide enhanced stability.

For example, an AGC/Sync-up sequence (e.g., in field 211) can be defined as a sequence with alternating "1" and "0" (e.g., 101010 . . . ), where each symbol "1" or "0" is OOK-modulated. This type of sequence advantageously features stability in power measurement and therefore the AGC can settle quickly at a WUR. It can also accelerate synchronization by measuring power within each symbol. A second AGC/Sync-up sequence can be composed of groups of multiple "is" followed by a single "0," such as "110110110 . . . ," where each symbol is OOK modulated. A third AGC/Sync-up sequence can be composed of all "1s."

Figure 3:
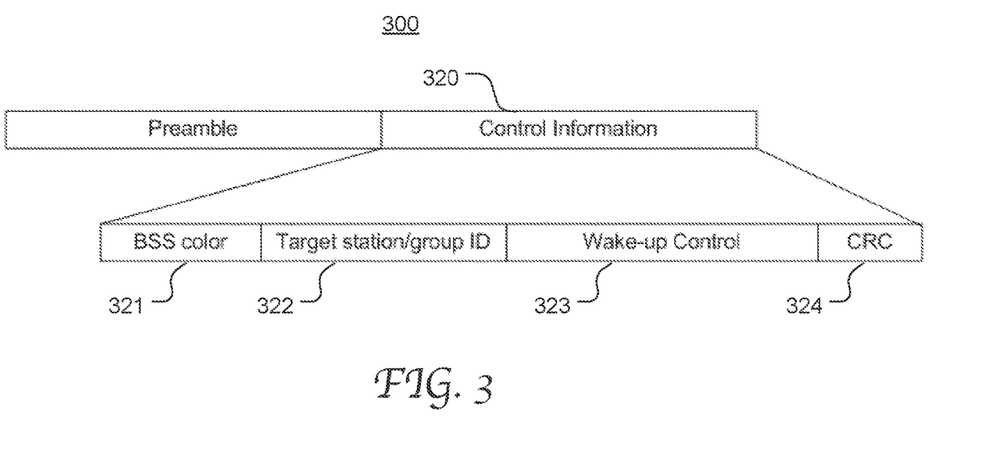
FIG. 3 illustrates the format of exemplary control information in a WUR packet according to an embodiment of the present disclosure.

FIG. 3 illustrates the format of exemplary control information in a WUR packet 300 in accordance with an embodiment of the present disclosure. The control information 320 may include fields that identify an AP STA (such as Basic Service Set (BSS) color) 321, and the target STA or target group 322 (such as the assigned ID for the station or group), wake-up control field 323 and Cyclic Redundancy Check (CRC) 324. A simple block error control coding can be applied to the control information to reduce the de-modulated errors. For example, hamming codes, Reed-Muller codes or Reed-Solomon codes can be applied. A CRC can be used to avoid false wake-ups caused by reception errors. The CRC field 324 may have 4, 6, 8, 10 or 12 bits for example.

Figure 4:
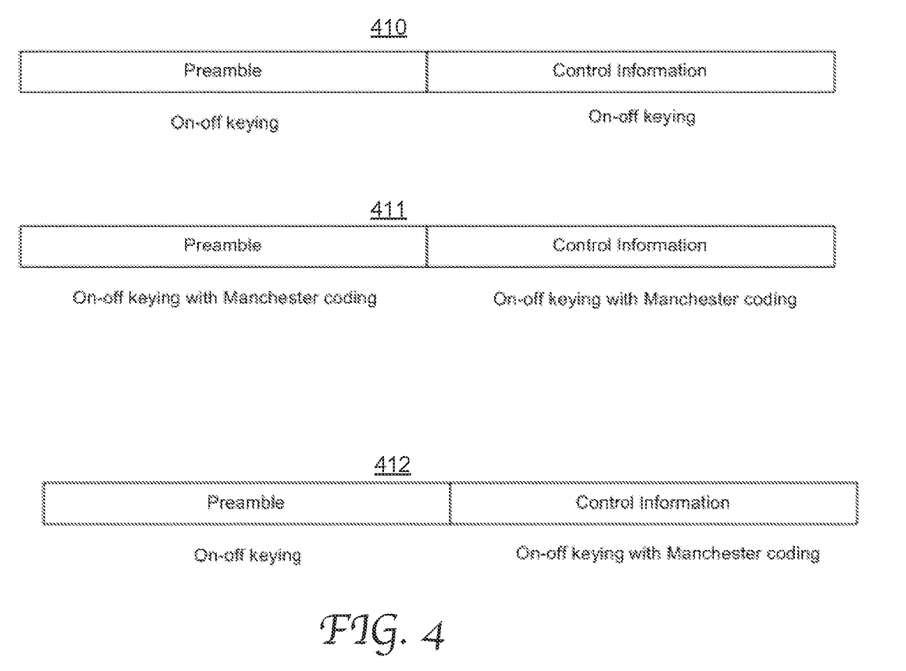
FIG. 4 illustrates exemplary modulation schemes for WUR packets according to embodiments of the present disclosure.
Figure 5:
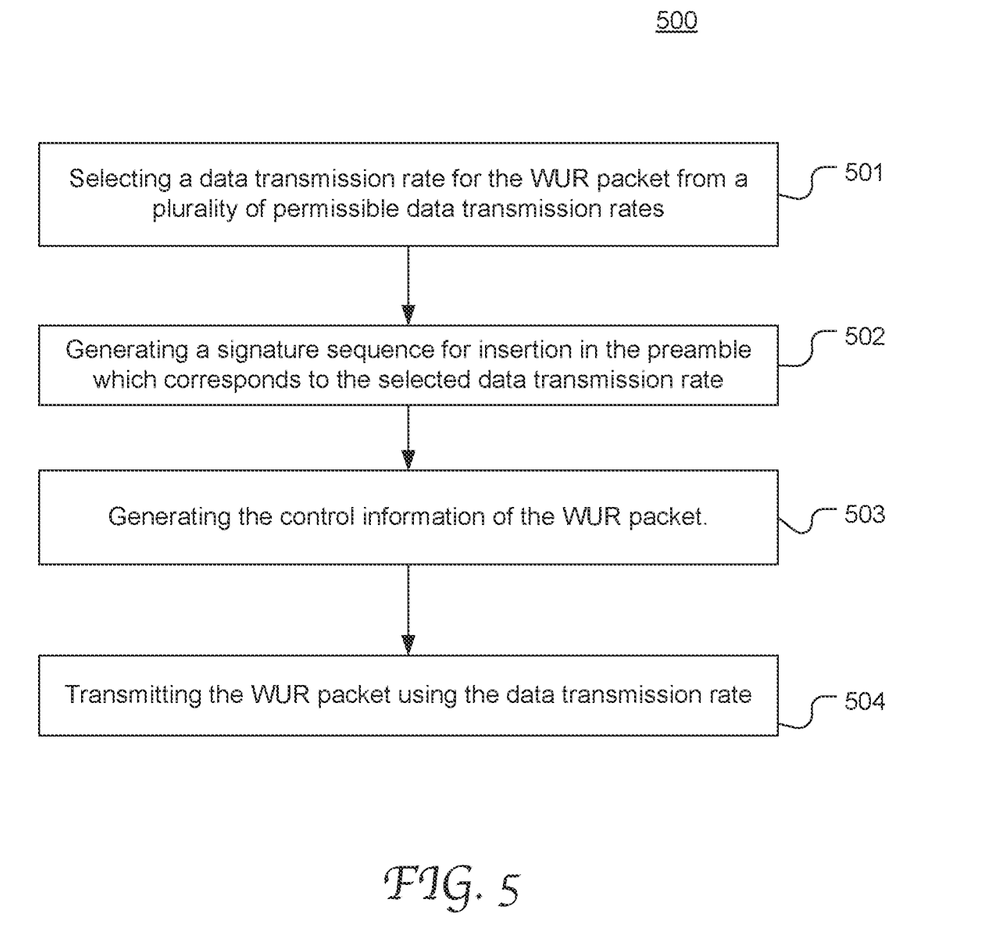
FIG. 5 is a flow chart depicting an exemplary process of generating a WUR packet that uses a signature sequence to indicate a data transmission rate in the preamble according to an embodiment of the present disclosure.

To reduce power consumption and simplify WUR design, OOK modulation can be used in WUR packets. FIG. 4 illustrates 3 exemplary modulation schemes of WUR packets according to embodiments of the present disclosure. Diagram 410 shows an embodiment in which the preamble and the control information are both modulated by ON/OFF Keying, each ON/OFF symbol can be 3 µs or 4 µs in length and each symbol may contain 1 bit information for example. Diagram 411 shows another embodiment in which the preamble and the control information are both modulated by ON/OFF Keying with Manchester coding. Diagram 413 shows still another embodiment in which the preamble uses ON/OFF Keying while the control information uses ON/OFF Keying with Manchester coding. Using the hybrid modulation scheme as in diagram 413 can achieve high efficiency in preamble communication as well as high reliability in control information communication FIG. 5 is a flow chart depicting an exemplary process 500 of generating a WUR packet that includes a signature sequence to indicate data transmission rate in the preamble in accordance with an embodiment of the present disclosure. Process 500 may be performed by a wireless transmitting device, such as an AP STA or a non-AP STA. At 501, a data transmission rate for the WUR packet is accessed. The data transmission rate is selected from a set of permissible rates. The present disclosure is not limited to any specific mechanism for selecting or determining a data transmission rate for a particular WUR packet. At 502, a signature sequence is selected from a set of predefined signature sequences based on the selected data transmission rate and inserted in the preamble. The number of predefined signature sequences may correspond to the number of permissible data transmission rates that are defined in an exemplary WUR protocol.

The signature sequence itself indicates the rate. At 503, the control information or the payload is generated and includes a wake-up signal directed to a WUR. The control information may include several fields as shown in FIG. 3. At 504, the WUR packet is transmitted through a wireless network channel using the same data transmission rate for both the preamble and the control information.

Figure 6:
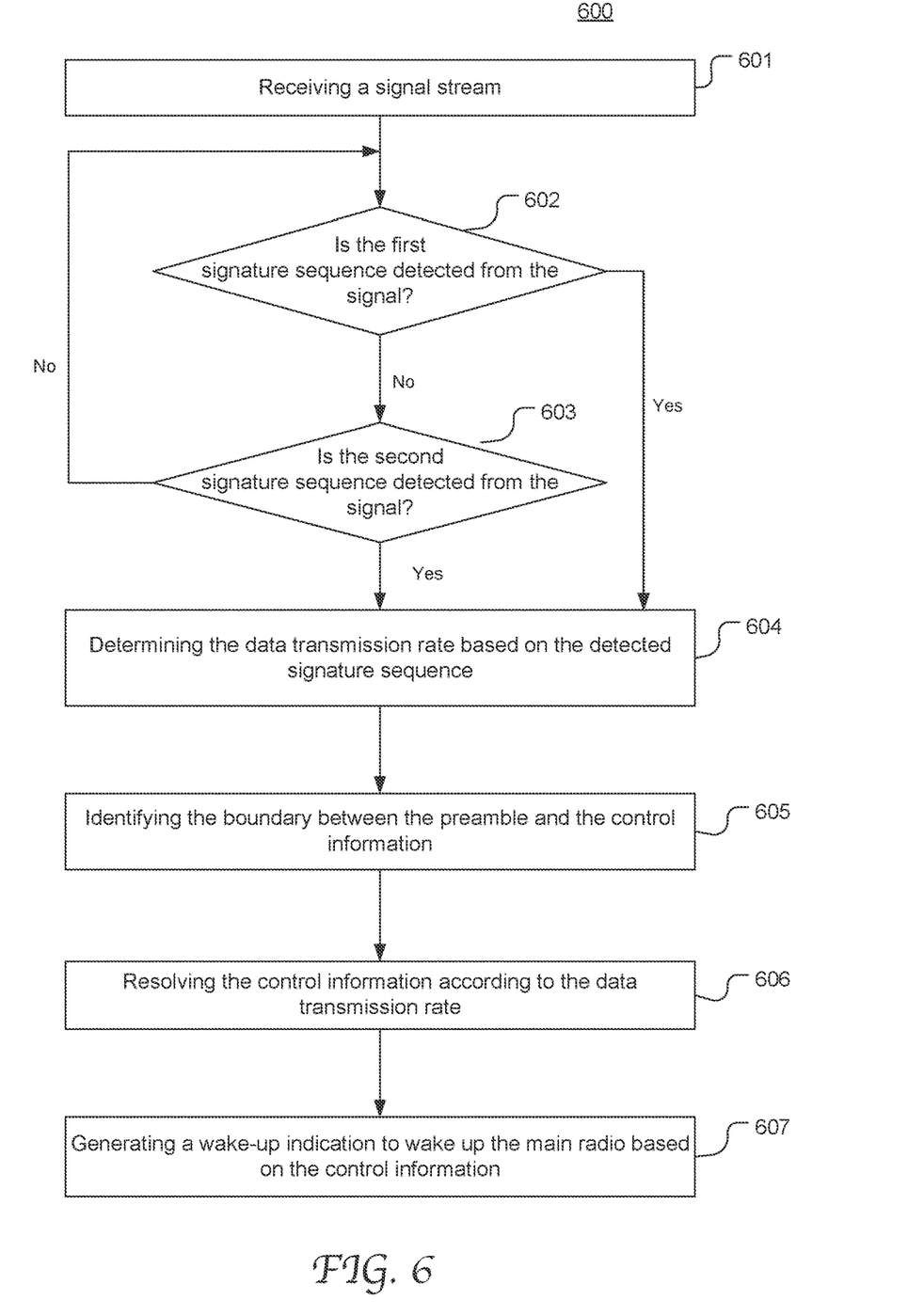
FIG. 6 is a flow chart depicting an exemplary process of processing a received WUR packet that includes a signature sequence in the preamble in accordance with an embodiment of the present disclosure.

FIG. 6 is a flow chart depicting an exemplary process 600 of processing a received WUR packet that uses a signature sequence in the preamble in accordance with an embodiment of the present disclosure. Process 600 may be performed by a WUR in a wireless receiving STA. At 601, a signal stream is received at the WUR. At 602 and 603, the WUR determines whether one of the set of predefined signature sequences is detected in the signal stream. In this example, there are only two signature sequences defined for a single sequence field of WUR preambles, each corresponding to, and would be transmitted in, a respective data transmission rate. Thus, if either signature sequence is detected, the WUR can directly determine the corresponding data rate 604. At 605, the boundary between the preamble and the control information can be determined once the end of the signature sequence is detected as its length is known. At 606, the control information is resolved according to the determined data transmission rate. At 607, if it is determined that the instant device is the intended device and the wake-up signal in the control information indicates to activate the main radio, the WUR generates a wake-up indication and sends it to the main radio.

Figure 7A:
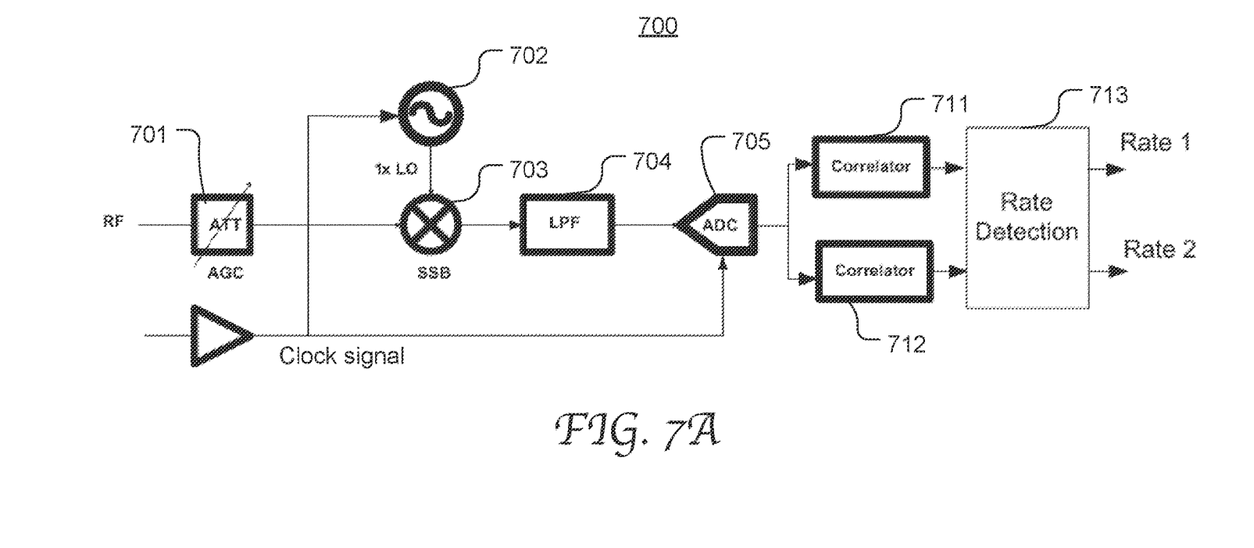
FIG. 7A illustrates the configuration of an exemplary WUR capable of detecting WUR packets and determining the transmission rates according to an embodiment of the present disclosure.

FIG. 7A illustrates the configuration of an exemplary WUR 700 capable of detecting WUR packets and determining the transmission rates in accordance with an embodiment of the present disclosure. The WUR includes an automatic gain controller (AGC) 701, an RF local oscillator 702, a mixer 703, a low pass filter 704, an analog-to-digital converter (ADC) 705, and two correlators 711 and 712.

The WUR 700 can receive signals of a wake-up packet through a receive antenna (not shown). The AGC 701 includes an attenuator and controls the magnitude or gain of the received signal. A baseband filter (not shown) filters the RF signal and the RF local oscillator 702 oscillates an RF frequency while shifting to a center frequency of the wake-up signal directed to the WUR 700 and outputs an RF local oscillation frequency to the mixer 703. The mixer 703 converts the RF signal from the baseband filter into a baseband signal by using the RF local oscillation frequency output from the RF local oscillator 702. The LPF 704 filters the baseband signal supplied from the mixer 703 while adjusting to the bandwidth of the wake-up signal. The ADC 705 converts the analog baseband signal output from the LPF 704 into a digital baseband signal, and the correlators 711 and 712 operates to detect a signature sequence in the converted signal.

In this example, there are two data rates (Rate 1 and Rate 2) defined for WUR packet transmission and therefore two signature sequences are defined. Each signature sequence is to be transmitted at its corresponding data rate. Each of the correlators 711 and 712, in combination with the rate detection module 713, tries to compare the converted signal with a respective signature sequence according to the corresponding data rate. Upon either of the correlators detecting a match between the converted signal and a signature sequence, the WUR can decide that the received signal carries a WUR packet and can also identify a data transmission rate of the WUR packet. The WUR 700 also includes an OOK signal detector (not explicitly shown) for demodulating the digital baseband signal output from the ADC 705. In some embodiments, the WUR may also include additional correlators in combination with detection modules configured to determine packet type, AGC and synchronization settings as indicated by another sequence field in the preamble.

Figure 7B:
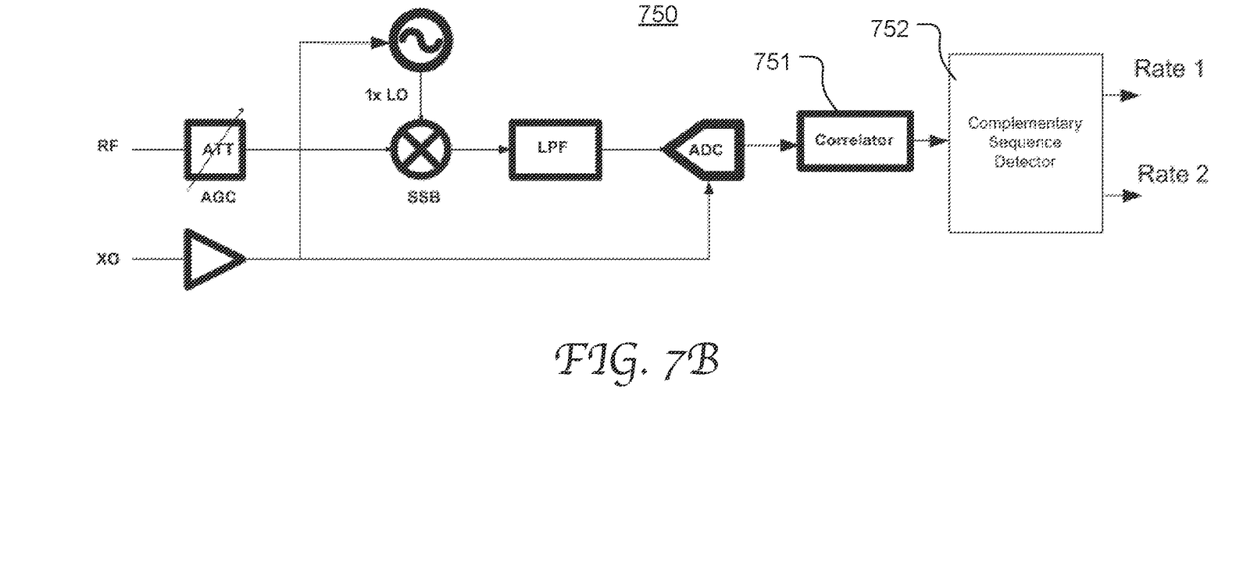
FIG. 7B illustrates the configuration of an exemplary WUR that uses a single correlator in combination with the complementary detector to detect two complementary signature sequences according to an embodiment of the present disclosure.

In the embodiment shown in FIG. 7A, the number of correlators in the WUR 700 may be the same as the set of predefined signature sequences, and each correlator is configured to detect a respective sequence in the corresponding data transmission rate. In some other embodiments, the set of predefined sequences include a pair of complementary sequences, e.g., corresponding to a low data rate and a high data rate, respectively. For example, for the low data rate, the signature sequence is predefined as S; and for the high data rate, the signature sequence is predefined as the complementary sequence of S or a partial complementary sequence of S. Thus, a single correlator suffices to determine whether the signal contains either complementary sequence. FIG. 7B illustrates the configuration of an exemplary WUR 750 that uses a single correlator 751 in combination with the complementary detector 752 to detect two complementary signature sequences in accordance with an embodiment. This can advantageously simplify the correlator/sequence detector design.

It will be appreciated that the preamble structures disclosed herein can be used in single-user (SU) or multi-user (MU) WUR packets. The communication devices according to embodiments of the present disclosure may have main radios configured to use one or more wireless communication technologies, such as Bluetooth®, WI-FI and/or cellular technologies, e.g., LTE, 4G, 5G, etc.

Figure 8:
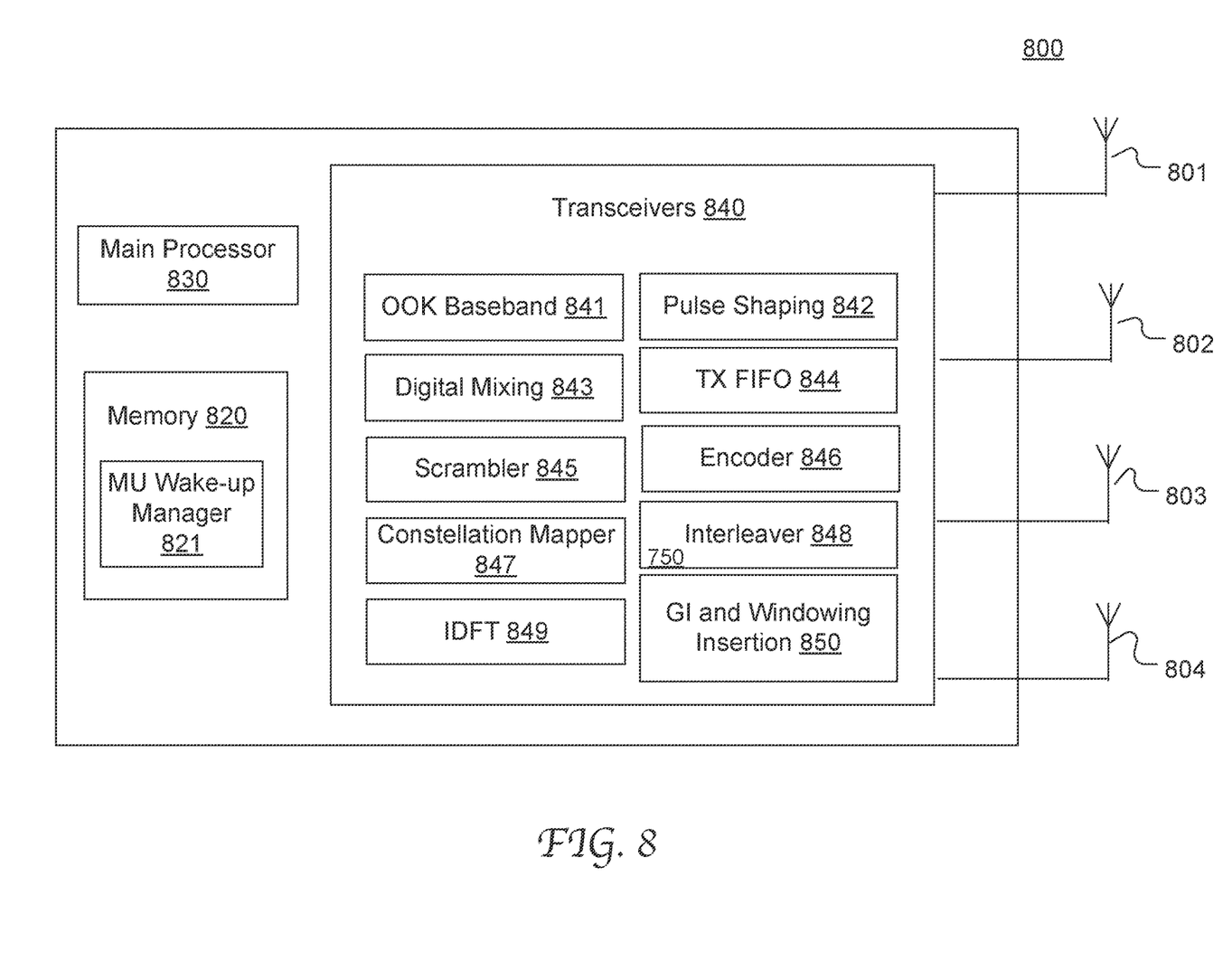
FIG. 8 is a block diagram illustrating an exemplary wireless communication device capable of generating wake-up packets with a sequence field in the preamble according to an embodiment of the present disclosure.

FIG. 8 is a block diagram illustrating an exemplary wireless communication device 800 capable of generating wake-up packets with a sequence field in the preamble in accordance with an embodiment of the present disclosure. The communication device 800 may be an AP or non-AP device having a transceiver configured for data communication, e.g., a general purpose computer, a smart phone, a portable electronic device, a tablet wearable device, a sensor used on Internet of Things (IoT), and etc.

The device 800 includes a main processor 830, a memory 820 and a transceiver 840 coupled to an array of antenna 801-804. The memory 820 includes a wake-up manger 821 that stores processor-executable instructions for generating preamble sequences and wake-up signals as well as configurations of other parts of WUR packets, as described in greater detail with reference to FIGS. 1-5. The wake-up manager 821 also stores other information related to WUR packet generation and management, such as the STA IDs, STA group IDs, sleep protocols of the main radios and WURs of the STAs, negotiation protocols, frequency sub-channels allocated to the respective WURs, MU wake-up packet formats, and so on. In some other embodiments, the wake-up manager 821 is stored in a memory within the transceiver 840.

The transceiver 840 includes an OOK baseband module 841, a pulse shaping module 842 and digital mixing module 843 which operate to generate OOK-modulated wake-up signals as well as preamble sequences as described in greater detail with reference to FIG. 1-5. The transceiver 840 further includes various modules of the transmit path which is configured to generate each section of a WUR packet or data packet or any other type of communication transmission units. For instance, it has a transmit First-In-First-Out (TX FIFO) 844, an encoder 846, a scrambler 845, an interleaver 848 a constellation mapper 847, an inversed discrete Fourier transformer (IDFT) 849, and a GI and windowing insertion module 850.

Figure 9:
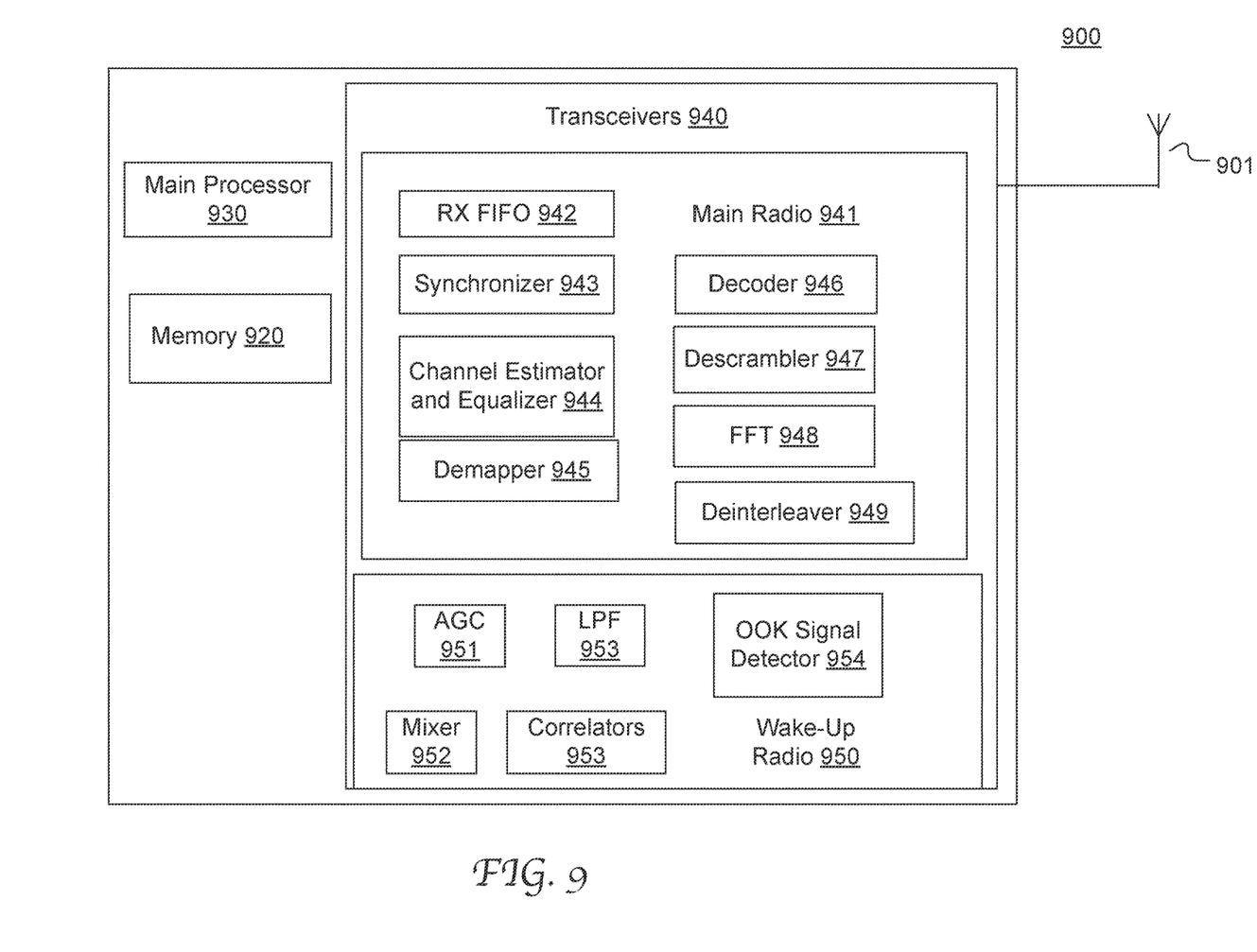
FIG. 9 is a block diagram illustrating an exemplary wireless communication device including a WUR capable of activating the main radio responsive to a WUR packet according to an embodiment of the present disclosure.

FIG. 9 is a block diagram illustrating an exemplary wireless communication device 900 including a WUR 950 capable of activating the main radio 941 responsive to an WUR packet in accordance with an embodiment of the present disclosure. The device 900 may be a non-AP STA operable to perform data communication with other devices through a wireless LAN. The device 900 may be a general purpose computer, a smart phone, a portable electronic device, a tablet wearable device, a sensor used on Internet of Things (IoT), and etc.

The device 900 includes a main processor 930, a memory 920 and a transceiver 940 coupled to an antenna 901. The transceiver 940 includes a main radio 941 operable to enter into an inactive state for power conservation. The low power wake-up radio (WUR) 950 can process an WUR packet and accordingly generate an indication to activate the main radio 941. Particularly, the WUR 950 includes an AGC 951, a mixer 952, an LPF 953, correlators 9532 and an OOK signal detector as described in greater detail with reference to FIGS. 7A-7B.

Various modules in the main radio 941 are configured to process received data packets or any other type of communication transmission units. As illustrated, the main radio includes a receiving First-In-First-Out (RX FIFO) 942, a synchronizer 943, a channel estimator and equalizer 944, a decoder 946, a demapper 945, a deinterleaver 949, a fast Fourier transformer (FFT) 948, and a descrambler 947.

It will be appreciated that the transceiver 840 in FIG. 8 and the transceiver 940 in FIG. 9 may include a wide range of other suitable components that are well known in the art. The various components can be implemented in any suitable manner that is well known in the art and can be implemented using hardware, firmware and software logic or any combination thereof. Further, in some embodiments, the transceiver 840 in FIG. 8 may as well include the components in a receiving path as described in greater detail with reference to the main radio 941 in FIG. 9, and vice versa.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising:
   receiving a signal stream;
   detecting a signature sequence of the signal stream, wherein the signature sequence indicates a data transmission rate, a packet, and a packet type;
   determining a data transmission rate for a wake-up signal based on the signature sequence, wherein the wake-up signal is operable to wake a radio;
   resolving control information for the wake-up signal based on the data transmission rate; and
   generating the wake-up signal operable to wake the radio based on the control information.

2. The method of claim 1, wherein the packet type comprises one of: a WUR beacon packet; and a WUR packet for a target station.

3. The method of claim 1, wherein the packet comprises the control information and a preamble, and wherein the control information and the preamble are modulated using On/Off Key (OOK) modulation.

4. The method of claim 1, wherein an end of the signature sequence corresponds to a boundary between said preamble and said control information, wherein said control information comprises: an identification of a Basic Service Set (BSS); and an identification of a target wireless station.

5. The method of claim 4, wherein said preamble comprises a single field that comprises said signature sequence.

6. The method of claim 1, wherein the detecting a signature sequence of the signal stream comprises detecting a first signature sequence of a plurality of signature sequences associated with different data transmission rates.

7. The method of claim 6, wherein each of said plurality of signature sequences is further operable to indicate a respective WUR packet type.

8. The method of claim 6, wherein said plurality of signature sequences comprise complementary sequences.

9. The method of claim 1, wherein said preamble further comprises another predefined sequence selected from another plurality of predefined sequences, wherein said another predefined sequence provides one or more of: automatic gain control and synchronization information associated with said WUR packet.

10. A wireless communication device comprising:
    a memory;
    a processor;
    a first radio configured to transmit and receive data packets in an operational mode; and
    a second radio coupled to said first radio and operable to:
       receive a signal stream;
       detect a signature sequence of the signal stream, wherein the signature sequence indicates a data transmission rate, a packet, and a packet type;
       determine a data transmission rate for a wake-up signal based on the signature sequence, wherein the wake-up signal is operable to wake the first radio;
       resolve control information for the wake-up signal based on the data transmission rate; and
       generate the wake-up signal to wake the first radio based on the control information.

11. The wireless communication device of claim 10, wherein the packet type comprises one of: a WUR beacon packet; and a WUR packet for a target station.

12. The wireless communication device of claim 10, wherein the packet comprises the control information and a preamble, and wherein the control information and the preamble are modulated using On/Off Key (OOK) modulation.

13. The wireless communication device of claim 10, wherein an end of the signature sequence corresponds to a boundary between said preamble and said control information, wherein said control information comprises: an identification of a Basic Service Set (BSS); and an identification of a target wireless station.

14. The wireless communication device of claim 13, wherein said preamble comprises a single field that comprises said signature sequence.

15. The wireless communication device of claim 10, wherein the detecting a signature sequence of the signal stream comprises detecting a first signature sequence of a plurality of signature sequences associated with different data transmission rates.

16. A wireless communication device comprising:
    a memory;
    a processor;

a first radio configured to transmit and receive data packets in an operational mode; and a second radio coupled to said first radio, wherein the second radio comprises:

an analog-to-digital converter (ADC) operable to convert an analog baseband of a received signal to a digital baseband signal;

an on-off key (OOK) signal detector operable to demodulate the digital baseband signal output from the ADC; and a correlator operable to receive the digital baseband signal demodulated by the OOK signal detector and detect a signature sequence therefrom, wherein the second radio is operable to determine a data transmission rate based on the signature sequence and to generate a wake-up signal operable to wake the first radio based on the signature sequence.

17. The wireless communication device of claim 16, further comprising a rate detection module operable to receive the signature sequence detected by the correlator and to determine the data transmission rate based on the signature sequence.

18. The wireless communication device of claim 16, wherein the second radio is further operable to resolve control information for the wake-up signal based on the data transmission rate, wherein the control information is modulated by OOK modulation.

19. The wireless communication device of claim 18, wherein the OOK modulation comprises Manchester coding.

20. The wireless communication device of claim 18, wherein the wakeup signal comprises the control information and a preamble, wherein the preamble is modulated by OOK modulation.

* * * * *